Figure 1:
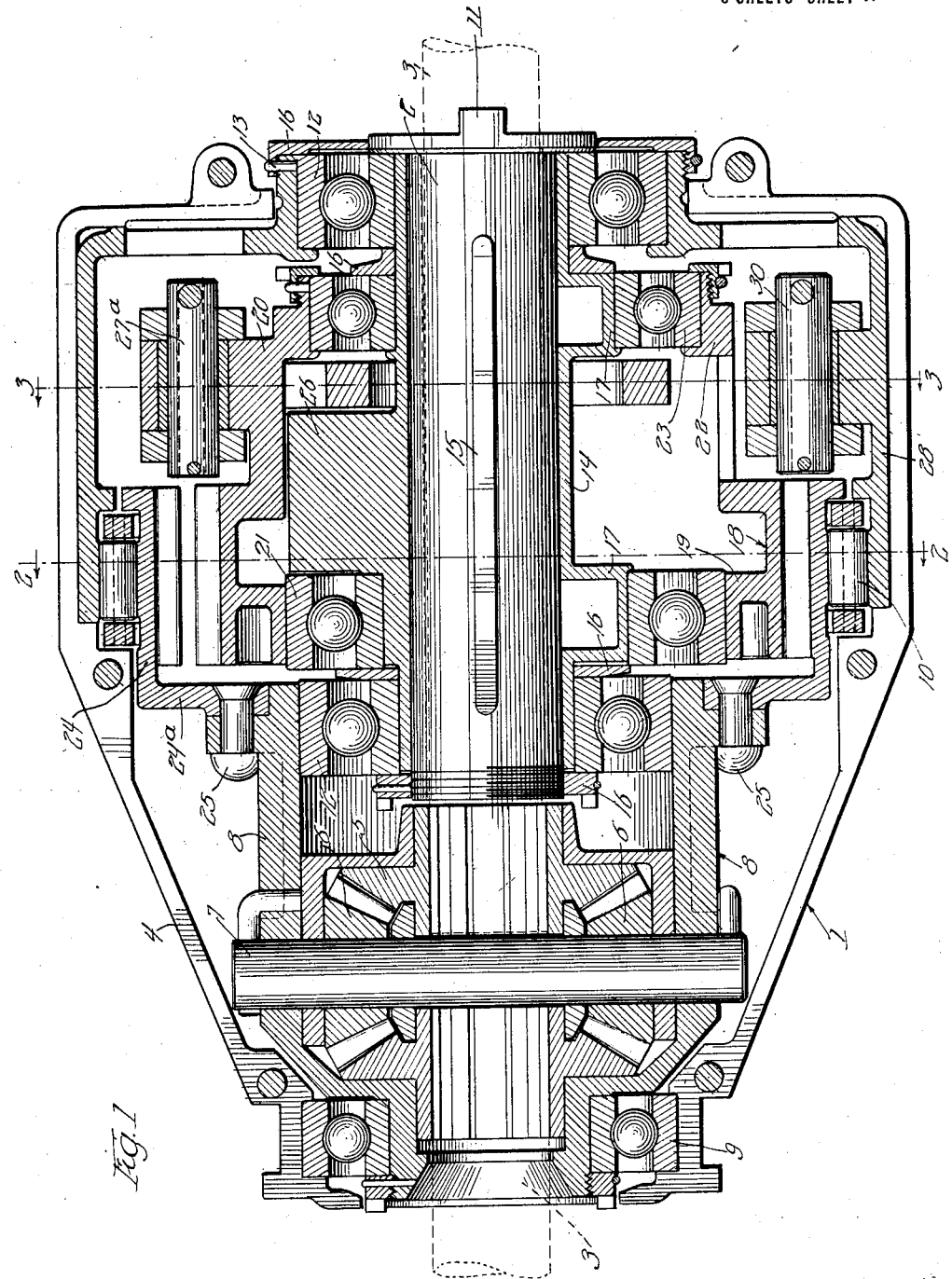

J. KROHN.
MECHANICAL MOVEMENT.
APPLICATION FILED APR. 26, 1920.

1,384,839.

Patented July 19, 1921.

3 SHEETS—SHEET 3.

Inventor
John Krohn
Attys

UNITED STATES PATENT OFFICE.

JOHN KROHN, OF NEWARK, NEW JERSEY.

MECHANICAL MOVEMENT.

1,384,839.   Specification of Letters Patent.   Patented July 19, 1921.

Application filed April 26, 1920. Serial No. 376,552.

*To all whom it may concern:*

Be it known that I, JOHN KROHN, a citizen of the United States, and a resident of Newark, in the county of Essex and State of New Jersey, have invented certain new and useful Improvements in Mechanical Movements, of which the following is a specification.

This invention relates to improvements in mechanical movement, and more particularly to the combination of mechanical elements adapted to produce a desired movement when incorporated in certain types of mechanism. The particular mechanical movement to which this invention relates finds its more advantageous use in driving or power transmitting mechanism for motor vehicles, and especially in the transmission or speed reducing gearing located intermediate the motor and the driving wheels of the vehicle. The particular type of transmission or reduction gearing embodies in general a driving and driven shaft, the driven shaft having an internal gear wheel fixed thereon, and carried upon the driving shaft in a so-called eccentric gear wheel of smaller pitch diameter, and of less number of teeth than the first mentioned internal gear wheel, the latter rotating or rolling about the internal gear, as the driving shaft is rotated, thereby transmitting a rotative movement to the driven internal gear wheel, at a rate of speed inversely proportional to the number of teeth of the internal gear wheel and eccentric gear wheel. This type of transmission or reduction gearing is one of several types employed where it is desired to transmit power from a prime mover to a point of application, as for instance, from a motor to the drive wheels of the vehicle, and at the same time provide for the reduction of the speed of rotation of the ultimate driven members, it being well understood that a proportionately increased power is obtained at the lower speeds, thereby making it necessary to provide reduction gearing in ordinary transmission mechanisms. The so-called eccentric type of reduction gearing has its peculiar advantages, such as the elimination of excessive friction loss which is present in other types of speed reducing gearing, all of which is fully set forth in a prior application filed by me for vehicle drive mechanism in the United States Patent Office on the 22nd day of March, 1917, and bearing Serial No. 156,621.

The transmission mechanism embodying my invention is herein described and illustrated as one especially designed as a part of the driving mechanism of an electric driven motor vehicle, although it is to be understood that the mechanical movement and the principle involved therein may be applied in any mechanism for the purpose of transmitting power and providing for the intermediate reduction of speed. The mechanism hereinafter described has reference to the accompanying drawings, in which—

Figure 2:
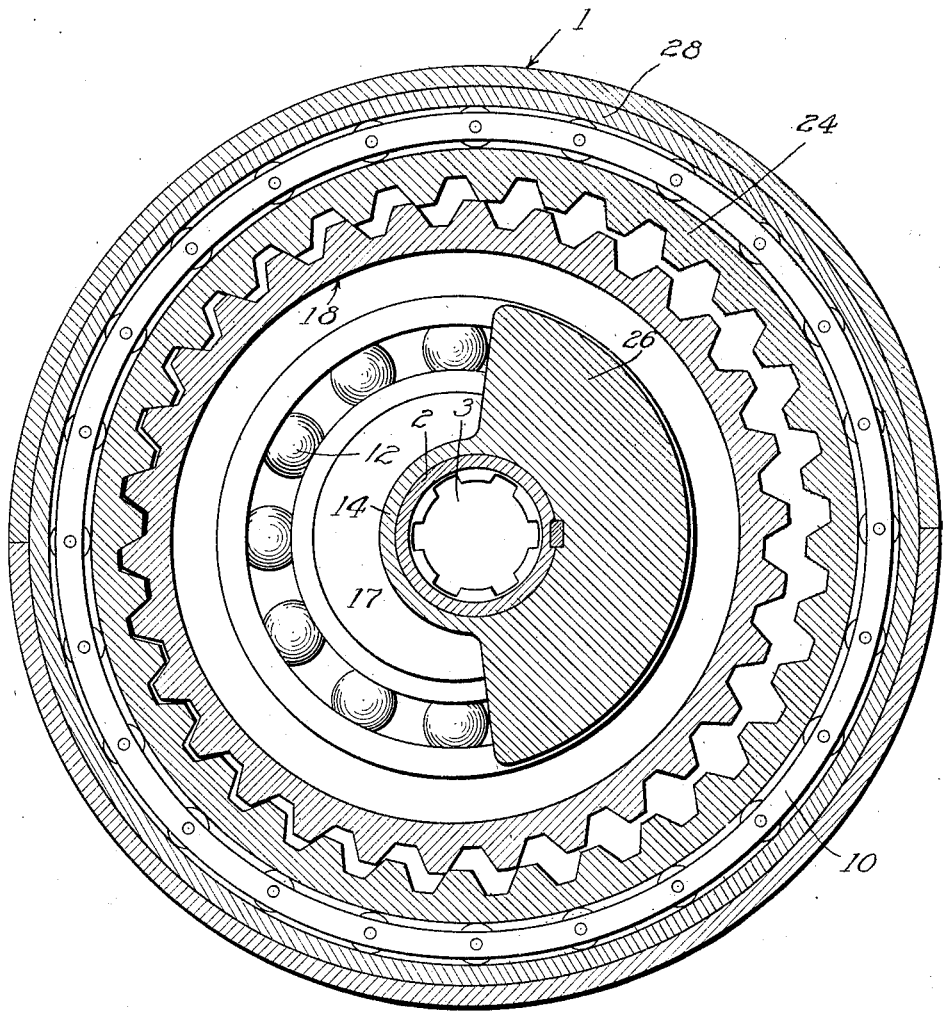
Figure 3:
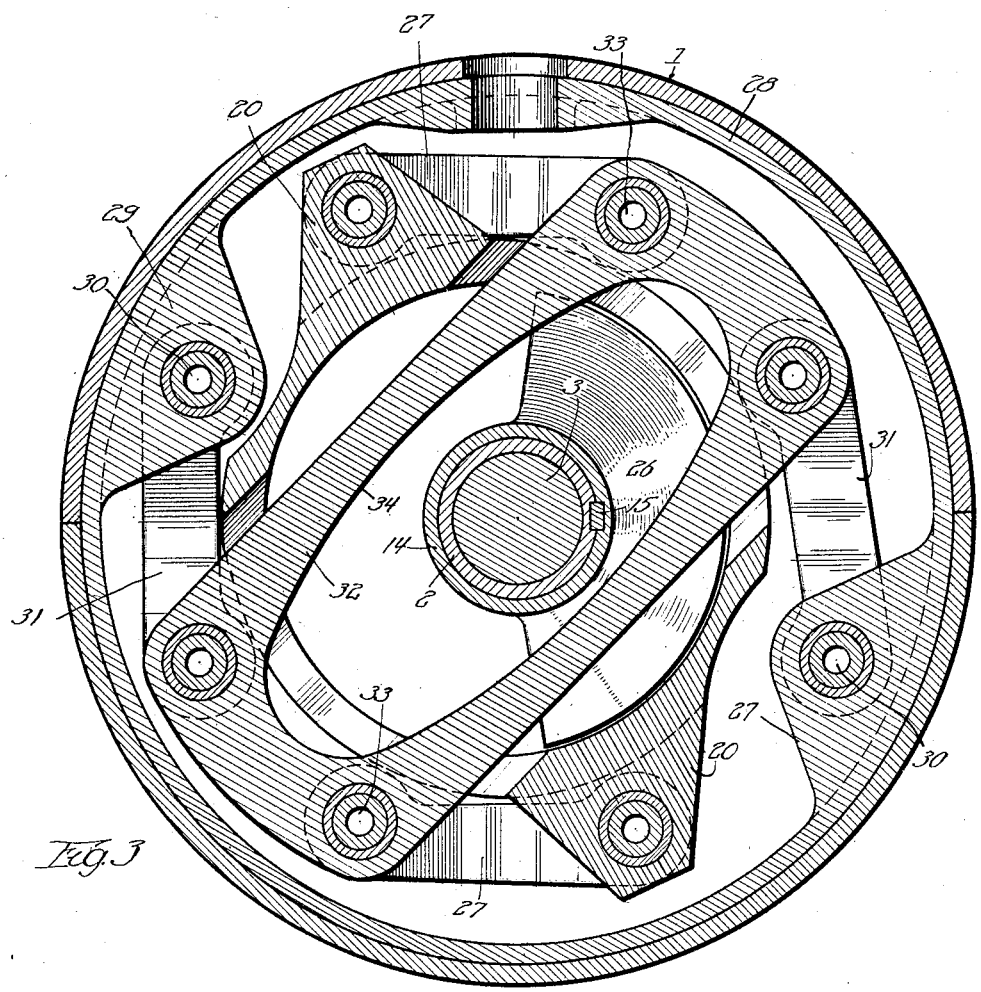

Figure 1 is a view in longitudinal section of a casing inclosing the driving and driven shafts, the differential mechanism associated therewith, and the speed reducing gearing embodying the mechanical movement of the invention, Fig. 2 is a cross sectional view taken on line 2—2 of Fig. 1, and Fig. 3 is a cross sectional view taken on line 3—3 of Fig. 1.

Referring in general to the mechanism and the parts associated with the mechanical movement involved, a casing 1, generally cylindric in shape, is supported upon a suitable supporting member, as for instance, the rear axle of the vehicle, said casing being arranged concentrically with respect to the driving shaft 2, which may be also termed the driving member, and the driven shafts 3—3, which may also be termed the driven members, said driving and driven shafts rotating about coincident axes, and terminating within the casing 1. Interposed between the driving shaft 2 and the driven shafts 3—3 is the usual form of differential gearing, the same being located at the left hand end of the casing 1, as shown in Fig. 1, and inclosed within that portion thereof, surrounded by the tapered wall portion 4. This differential mechanism, which will be described more in detail, serves the usual purpose of compensating for the increased speed of rotation of either driven shaft (which are directly connected to the driving wheels) in the travel of the vehicle in a curvilinear path. The differential mechanism comprises a pair of similar and oppositely facing beveled gear wheels 5—5 keyed to the adjacent ends of the driven shafts 3—3, these beveled gear wheels meshing with a pair of beveled pinions 6—6 journaled upon a shaft 7, extending at right angles to the axes of the driven shafts 3—3, said beveled pinion shaft 7 being mounted at its ends in a rotative sleeve 8 surrounding the differential mechanism and journaled within the casing by means of anti-friction ball bearing 9 located at the extreme end of the casing adjacent the differential mechanism, and an anti-friction roller bearing 10 located substantially intermediate the ends of the casing. The sleeve 8, as will hereinafter appear, is driven by means of the reduction gear members, and transmits rotative movement to the driven shafts 3—3 through the medium of the differential mechanism, the function of the latter being so well known that it is thought unnecessary to describe the same in detail.

The driving shaft or member 2 consists of a tubular member surrounding the driven shaft 3, extending from the right hand end of the casing 1, and is positively connected or coupled with a motor at its outer end, said shaft 2 being provided with a coupling member 11 adapted to engage a companion coupling member not shown. The shaft 2 extends inwardly to a point adjacent the differential mechanism, and is journaled within the casing by means of anti-friction ball bearings 12—12 mounted at the ends thereof, the outermost bearing being retained within a radial groove 13 formed in the casing, whereas the inner bearing is supported between the rotative sleeve 8 and a sleeve 14 surrounding the driving shaft 2, and rigidly fixed thereto by means of a key 15. Thrust collars 16—16 are mounted at either side of the bearings 12—12 and serve to retain the same in position. The sleeve 14 extends substantially throughout the length of the driving shaft 2 and directly supports at its extreme ends the ball bearings 12—12 before mentioned. Immediately adjacent to and inwardly from the end portions of the sleeve 14 are formed radial bearing surfaces 17—17, having their surfaces arranged eccentrically to the axis of the sleeve 14 and of the driving shaft 2. Upon these eccentric bearing surfaces is carried a so-called eccentric gear 18, the same comprising a toothed body portion 19 and a pair of longitudinally extending lugs 20 terminating in the space intermediate the body portion 19 and the adjacent end of the casing. The so-called eccentric gear 18 is in reality concentric with respect to its own or true axis, although by reason of the eccentirc bearing members 17—17 on which it is mounted, it rotates with an eccentric motion, as will hereinafter be described. Intermediate the body portion of the eccentric gear wheel 18 is a ball bearing 21, and similarly between a ring 22 located substantially in the plane of the lugs 20 and integral therewith, is a ball bearing 23, said ball bearings 21 and 23 serving to anti-frictionally mount the eccentric gear and member upon the eccentric bearing members 17—17. Surrounding the body portion 19 of the eccentric gear wheel 18 is an internal gear wheel 24, the same having slightly greater pitch diameter than the eccentric gear wheel 18, and having say one more tooth than has the said eccentric gear wheel 18. As clearly shown in Fig. 2, the gear wheel 18 meshes with the surrounding internal gear wheel 24, the latter being concentric with respect to the axes of rotation of the driving and driven shafts. The internal gear wheel 24 is fixed to the rotative sleeve 8, and in reality forms the inner extremity thereof, said internal gear wheel being provided with an integral radial flange 24$^a$ which is securely fastened to the inner end of the sleeve 8 by means of rivets or other fastening members 25. The roller bearing 10 hereinbefore mentioned surrounds the internal gear 24 and anti-frictionally supports the inner end of the sleeve 8 within the casing 1.

It is obvious that if the driving sleeve 2 is rotated and carries with it the surrounding sleeve 14 with its eccentric bearing member 17, that a rotative movement will be imparted to the eccentric gear wheel 18, driving the same with an eccentric motion around the internal gear wheel 24 with a rolling movement. By reason of the less number of teeth in the eccentric gear wheel 18, the rolling engagement between the gear wheels will effect a relative rotation of the internal gear wheel 24 at a comparatively slower speed, which may be expressed in terms of the ratio between the number of teeth upon each gear wheel. Inasmuch as the principle involved is well known, it need not be set forth in detail. The rotative movement imparted to the internal gear wheel 24 is transmitted to the sleeve 8, and in turn to the driven shafts 3—3 through the medium of the differential mechanism, inasmuch as the beveled pinion shaft 7 is mounted or carried by the rotative sleeve 8.

Inasmuch as the eccentric gear wheel 18 is designed to be rotated at a high rate of speed, it is desirable that this member be supported in such manner as to permit its motion to be a smooth rolling movement without undue vibration and excessive wear between the tooth surfaces. This desired movement is accomplished by providing an arrangement of links connecting the eccentric gear to the surrounding casing 1, and also by the provision of a counter-weight 26 formed integral with the sleeve 14 carried upon the driving shaft 2. The counter-weight 26 is of sufficient weight to overcome or compensate for the inequality of distribution of the mass of the eccentric gear 18 in its rotation about an axis offset from the common axis of the remaining parts of the mechanism. Inasmuch as this member forms no part of the present invention, further description thereof will be omitted.

Referring now to the arrangement of the links hereinbefore suggested, the lugs 20—20 before described as an integral part of the eccentric gear wheel 18, are located at diametrically opposed points and project a short distance radially beyond the surface of the toothed body portion 19 of said gear wheel. Pivotally connected to each of these lugs 20—20 are links 27—27, the links being journaled on pivot pins 28 whose axes lie in the arc of a circle described about the true center of the gear wheel 18. The links 27—27 extend tangentially in opposite directions, and have a length substantially equal to the chord subtended by an arc of substantially 60 degrees. Integral with a sleeve 28 engaging the inner surface of the casing 1, and surrounding the space occupied by the gear wheels and parts associated therewith, are inwardly projecting radial lugs 29—29 disposed diametrically opposite each other and displaced angularly a short distance from the lugs 20—20 of the eccentric gear wheel 18. Journaled to these lugs by means of pivot pins 30—30 are links 31—31, these links extending tangentially in opposite directions with respect to each other, and likewise with respect to the links 27—27 adjacent thereto; in other words each link 31 extends tangentially in a direction toward the link 27 pivoted opposite thereto. The free ends of the pairs of links 27—27 and 31—31 terminate in angularly spaced relation to each other, and have pivotal connection with a plate 32 lying in a plane transverse to the axis of rotation of the driving shaft 2, said plate being substantially rectangular in shape, and having pivotal connection at its corners with the free ends of the links, as suggested, by means of pivot pins 33. The central portion of the plate is removed by the provision of an oval shaped slot 34 through which the driving shaft 2 and sleeve 14 extend, said slot being provided to permit the plate to oscillate freely as determined by the movement of the links 27 and 31.

As the eccentric gear wheel 18 rolls about the internal gear wheel 24 with its eccentric motion, it is manifest that the lugs 20 will have a corresponding motion, as will the ends of the links 27—27 connected thereto, the free ends of the links 27—27 being pivotally connected to the plate 32 at diagonally opposed corners, and said plate in turn being supported by the links 31 at the opposite diagonal corners to the surrounding sleeve 28 (forming in reality a part of the casing 1) through the medium of the links 31. All of the parts are actuated with a peculiar oscillatory movement of a somewhat limited extent, the several links opposing and restraining the movement of the others so that a smooth and completely balanced motion is secured throughout the entire mechanism.

In this manner it is possible to support or sustain the eccentrical moving mass in the form of a gear wheel, and to have it operate smoothly in combination with concentrical rotating bodies, at the high speeds that are utilized in the power transmission mechanism of motor vehicles, and it is thus possible to employ the so-called eccentric gear type of speed reduction mechanism and secure all the advantages thereof without combating the disadvantages that ordinarily attend its use such as the excessive vibration at high speeds and the excessive wear throughout the parts where other devices, such as the well known "Oldham" coupling would ordinarily be employed.

Although I have shown and described a preferred application of the mechanical movement embodying my invention, it is to be understood that its uses are not limited to the mechanism such as described, and furthermore, its parts may be variously modified without departing from the principle involved or the spirit of the invention, and therefore I do not wish to be limited except in so far as the invention is specifically set forth in the appended claims.

I claim as my invention:

1. A mechanical movement comprising a driving member, a driven member, rotative members carried by said driving and driven members, and having driving connection with each other, one of said rotative members having bodily eccentric movement about the axis of rotation of the member carrying the same, a link pivotally connected to said eccentric member, another link pivoted at a fixed point located adjacent the path of said eccentrically rotative member, and a member pivotally connecting the free ends of said links.

2. A mechanical movement comprising a driving member, a driven member, rotative members carried by said driving and driven members, and having driving connection with each other, one of said rotative members having bodily eccentric movement about the axis of rotation of the member carrying the same, a pair of links pivotally connected to said eccentric rotative member at points diametrically opposed, a pair of links pivoted at fixed points diametrically disposed to each other, and a member pivotally connecting the free ends of all of said links.

3. A mechanical movement comprising a driving member, a driven member, rotative members carried by said driving and driven members, and having driving connection with each other, one of said rotative members having bodily eccentric movement about the axis of rotation of the member carrying the same, a link pivotally connected to said eccentric member adjacent its periphery, and extending substantially tangential thereto, another link pivoted at a fixed point located adjacent the periphery of said eccentrically rotative member, and extending substantially tangential thereto, and a freely movable member pivotally connecting the free ends of said links.

4. A mechanical movement comprising a driving member, a driven member, rotative members carried by said driving and driven members, and having driving connection with each other, one of said rotative members having bodily eccentric movement about the axis of rotation of the member carrying the same, a pair of links pivotally connected to said eccentric rotative member at points diametrically opposed, and extending in the same clockwise direction, a pair of links pivoted at fixed points diametrically disposed to each other, and extending in the opposite clockwise direction, and a freely movable member pivotally connecting the free ends of said links.

5. A mechanical movement comprising a driving member, a driven member, a pair of intermeshing gear wheels, one of said gear wheels being mounted concentrically on one of said driving and driven members, and the other being mounted for bodily eccentric movement relative to the axis of the other of said driving and driven members, and means for supporting said eccentric gear member, comprising a pair of links pivotally connected to said eccentric gear member at diametrically opposed points, a pair of links pivotally mounted at fixed points diametrically opposed with respect to the axis of rotation of the driving and driven members, and a plate having pivotal connection with the free ends of said links, the links of each pair being connected thereto at diametrically opposed points.

6. A mechanical movement comprising a driving member, a driven member, a pair of intermeshing gear wheels, one of said gear wheels being mounted concentrically on one of said driving and driven members, and the other being mounted for bodily eccentric movement relative to the axis of the other of said driving and driven members, and means for supporting said eccentric gear member comprising a pair of links, one of said pairs being pivotally connected to said eccentric gear member at points diametrically opposed with respect to the true axis thereof, the other pair being pivoted at fixed points disposed radially with respect to the axis of rotation of said driving and driven members, and a plate having pivotal connection with the free ends of said links.

7. A mechanical movement comprising a driving and a driven member, having coincident axes of rotation, an external gear member concentrically mounted on said driven member, an internal gear member mounted on said driving member and having bodily eccentric movement about the axis thereof, and in rolling engagement with said concentric gear member, means for imparting eccentric rotative movement to said internal gear member, a pair of links pivotally connected at diametrically opposed points on the periphery of said internal gear member, and extending tangentially thereto in the same clockwise direction, a pair of links pivoted at fixed points located in approximately the same arc as the pivotal points of said other links, and extending tangentially in the opposite clockwise direction, and a plate of rectangular conformation having pivotal connection with the free ends of said pairs of links, the links of each pair being connected thereto at diametrically opposed points.

In witness whereof, I hereunto subscribe my name this 22nd day of April, A. D. 1920.

JOHN KROHN.